(12) United States Patent
Fink

(10) Patent No.: US 8,880,286 B2
(45) Date of Patent: Nov. 4, 2014

(54) WHEEL ELECTRONICS UNIT, VEHICLE WHEEL AND VEHICLE

(75) Inventor: Alexander Fink, Oakland Township, MI (US)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/382,189

(22) PCT Filed: Dec. 9, 2010

(86) PCT No.: PCT/EP2010/069286
§ 371 (c)(1),
(2), (4) Date: Jan. 4, 2012

(87) PCT Pub. No.: WO2011/085878
PCT Pub. Date: Jul. 21, 2011

(65) Prior Publication Data
US 2012/0253590 A1 Oct. 4, 2012

(30) Foreign Application Priority Data

Dec. 21, 2009 (DE) .......................... 10 2009 059 789

(51) Int. Cl.
*B60C 23/04* (2006.01)
(52) U.S. Cl.
CPC ......... *B60C 23/0408* (2013.01); *B60C 23/0489* (2013.01); *B60C 23/0425* (2013.01); *B60C 23/0437* (2013.01)
USPC ....................................................... 701/34.4

(58) Field of Classification Search
CPC ............ B60C 23/0408; B60C 23/0425; B60C 23/0437; B60C 23/0489
USPC ........................................................ 701/34.4
See application file for complete search history.

(56) References Cited

U.S. PATENT DOCUMENTS

| 5,913,240 | A | 6/1999 | Drähne et al. |
| 6,658,927 | B1 | 12/2003 | Goslar et al. |
| 6,721,375 | B1 | 4/2004 | Hammel |
| 6,801,872 | B2 | 10/2004 | Normann et al. |
| 6,967,571 | B2* | 11/2005 | Tsujita .......................... 340/447 |
| 7,158,866 | B2* | 1/2007 | Gustafsson et al. .............. 701/1 |
| 7,227,458 | B2 | 6/2007 | Watabe et al. |
| 7,362,218 | B2* | 4/2008 | McCall et al. ................ 340/447 |
| 8,402,821 | B2* | 3/2013 | Fink et al. .................... 73/146.5 |
| 2004/0066290 | A1 | 4/2004 | Hernando et al. |

(Continued)

FOREIGN PATENT DOCUMENTS

| DE | 103 42 297 A1 | 4/2005 |
| DE | 102004042191 B3 | 2/2006 |

(Continued)

*Primary Examiner* — John R Olszewski
*Assistant Examiner* — Todd Melton
(74) *Attorney, Agent, or Firm* — Laurence A. Greenberg; Werner H. Stemer; Ralph E. Locher

(57) ABSTRACT

A wheel electronics unit for a wheel information device in the installed state is arranged in a vehicle wheel of a vehicle. The wheel electronics unit contains a first sensor that is configured to record a measuring signal, which includes at least one first wheel-specific parameter, and an evaluation unit, which is configured to determine a current rotational position of the vehicle wheel at the time of the measurement on the basis of the measurement signal.

24 Claims, 14 Drawing Sheets

(56) References Cited

U.S. PATENT DOCUMENTS

| | | |
|---|---|---|
| 2004/0090322 A1 | 5/2004 | Tsujita |
| 2005/0156722 A1 | 7/2005 | McCall et al. |
| 2006/0179930 A1 | 8/2006 | Lin |
| 2007/0260376 A1 | 11/2007 | Hattori |
| 2009/0293602 A1 | 12/2009 | Gotschlich |

FOREIGN PATENT DOCUMENTS

| | | |
|---|---|---|
| DE | 60301378 T2 | 6/2006 |
| EP | 1 419 907 A1 | 5/2004 |
| JP | 10271171 A | 10/1998 |
| JP | 2002530987 A | 9/2002 |
| JP | 2003509666 A | 3/2003 |
| JP | 2003527608 A | 9/2003 |
| JP | 2004161113 A | 6/2004 |
| JP | 2004171519 A | 6/2004 |
| JP | 2004333434 A | 11/2004 |
| JP | 2005321958 A | 11/2005 |
| JP | 2006182253 A | 7/2006 |
| JP | 2007519123 A | 7/2007 |

\* cited by examiner

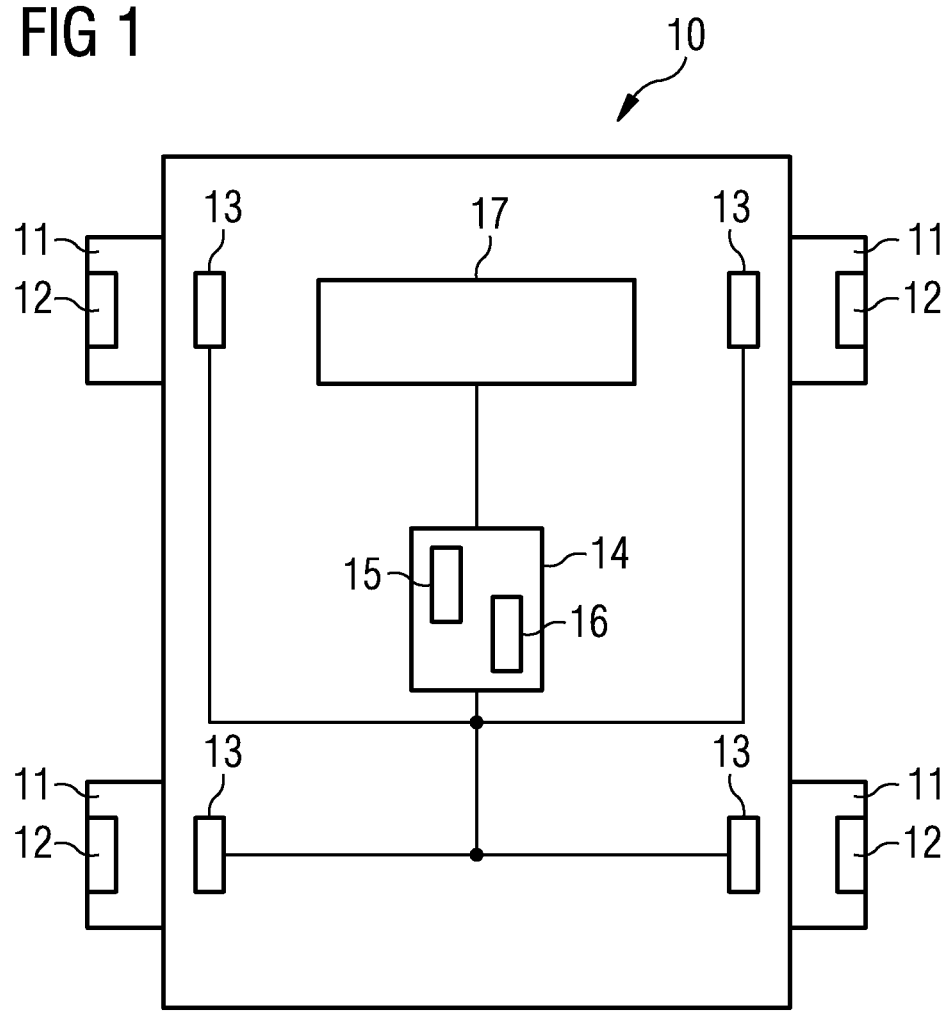

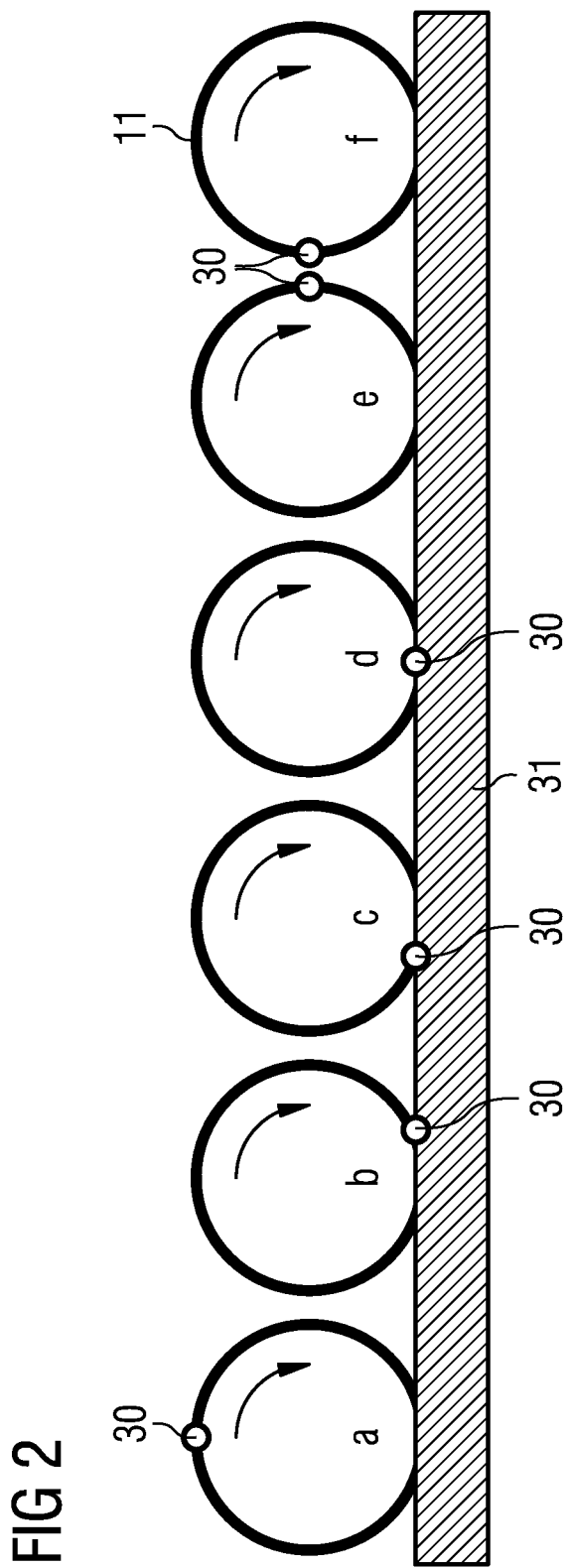

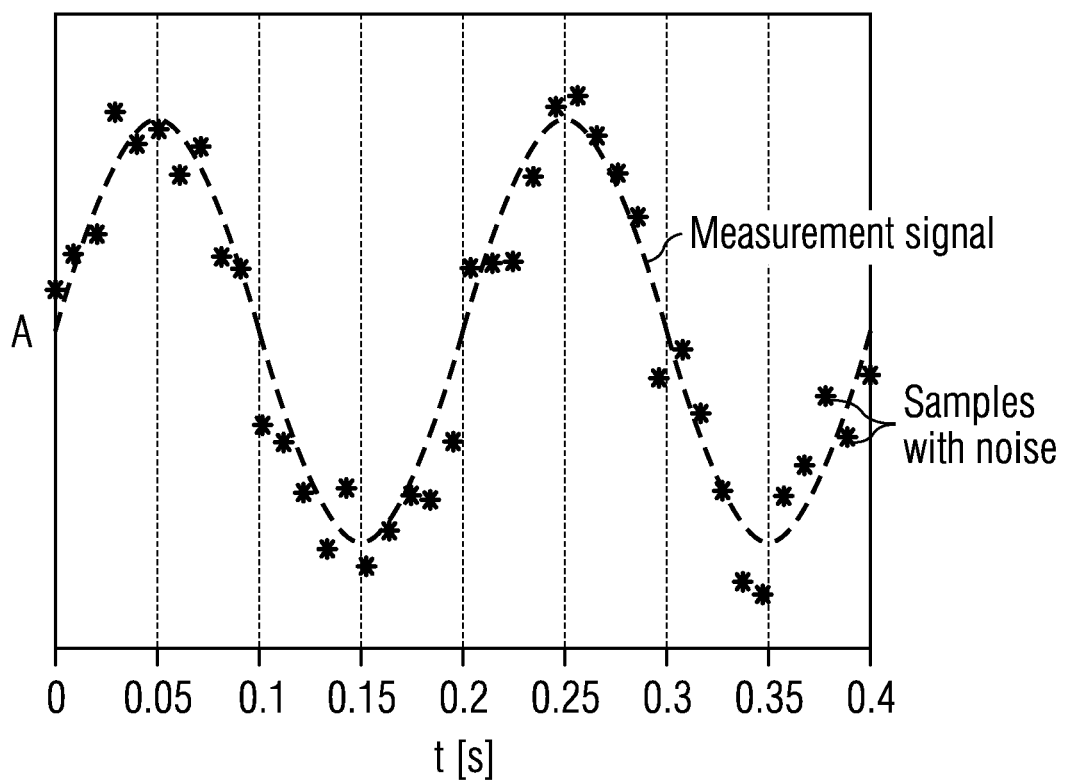

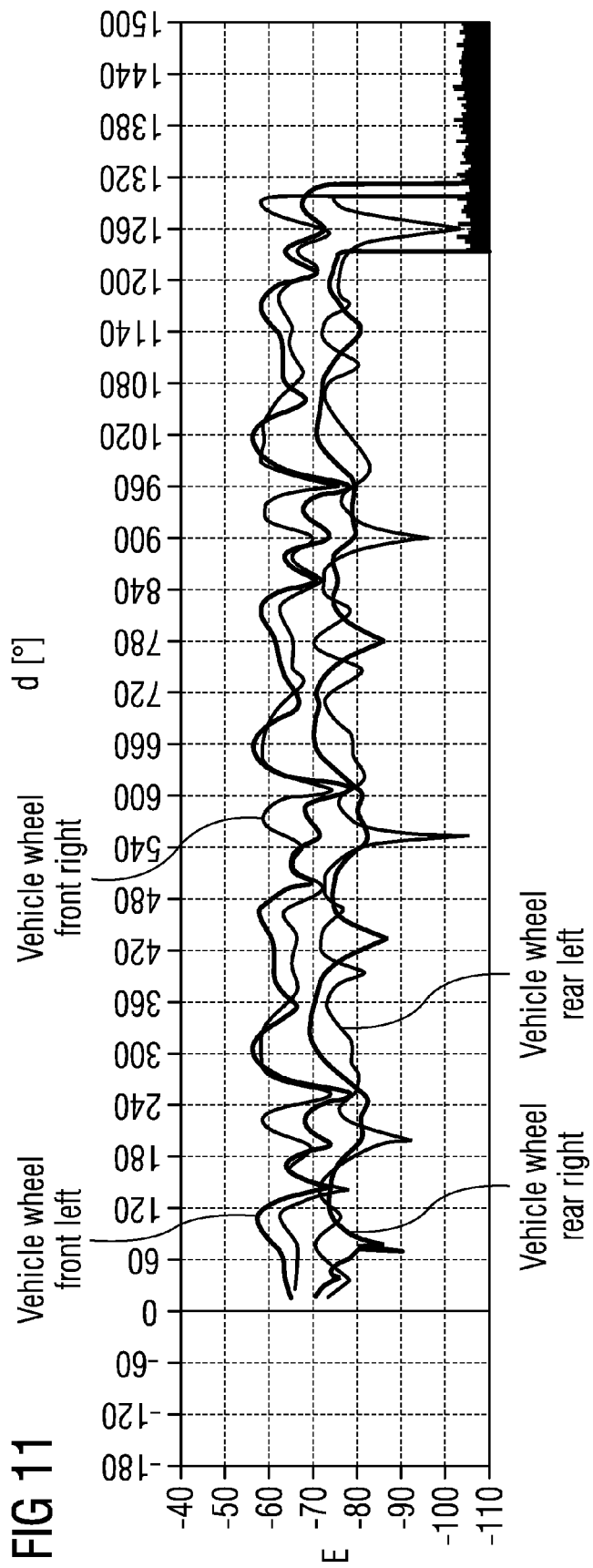

WHEEL ELECTRONICS UNIT, VEHICLE WHEEL AND VEHICLE

BACKGROUND OF THE INVENTION

Field of the Invention

The present invention relates to a wheel electronics unit, a vehicle wheel and a vehicle.

Due to the most varied causes, for example the ambient pressure of the wheel, temperature, age of the wheel etc., the tire pressure of a vehicle wheel is subject to particular changes. In this context, it has been found that a wrongly adjusted tire pressure represents a significant factor in accidents in road traffic. Since the vehicle safety and reliability are central factors in the automobile field, the tire pressure must be regularly checked even just for safety reasons. However, studies have shown that only few drivers of a vehicle regularly check the tire pressure.

For these reasons, among others, modern motor vehicles have tire information devices. These tire information devices have wheel electronics units built into the vehicle wheel which measure wheel-specific measurement values of various measurement variables (e.g. tire pressure, tire temperature, wheel load etc.) and send information derived therefrom to a receiving device at the vehicle. The wheel electronics unit can also be used for wheel positioning.

BRIEF SUMMARY OF THE INVENTION

The present invention is thus based on the object of providing an improved wheel electronics unit.

Accordingly, the following is provided:

A wheel electronics unit for a tire information device which, in the installed state, is arranged in a vehicle wheel of a vehicle, containing: a first sensor which is designed for recording a measurement signal which has at least one first wheel-specific parameter, and an evaluating device which is designed for determining from the measurement signal a current rotational position of the wheel at the time of the measurement.

A vehicle wheel, particularly for a vehicle equipped with a tire information device, which has a rim and a tire, wherein the vehicle wheel also has at least one wheel electronics unit according to the invention, arranged in or at the vehicle wheel.

A vehicle, particularly a passenger car, having a number of wheels and having a tire information device, wherein at least one wheel is equipped with a wheel electronics unit according to the invention.

The concept forming the basis of the present invention consists in providing in a wheel electronics unit such as can be used in or for a tire information device, a sensor for determining wheel-specific parameters. Such sensors, known per se, in wheel electronics units are usually used for sending information from measured wheel-specific parameters via a transmitting device to a receiving device at the vehicle. In the present invention, the wheel-specific parameters and measurement values, measured by the sensor, are then additionally supplied to an evaluating device specifically provided in the wheel electronics unit, where they are then evaluated. The current rotational position of the vehicle wheel is then determined from the measured first wheel-specific parameters by means of the evaluating device. By this means, the functionality of the wheel electronics unit and of the first sensor provided in the wheel electronics unit is extended. In particular, it is no longer only wheel-specific parameters which are now sent out by the wheel electronics unit. Instead, information about the time at which the measurement of the wheel-specific parameters has taken place and/or the time at which the information containing the wheel-specific parameters is to be sent out is also obtained additionally or as an alternative.

Advantageous embodiments and developments of the invention are obtained from the further subclaims, looked at together with the figures of the drawing.

In a preferred embodiment, a transmitting device is provided for transmitting an information signal. This information signal can contain, e.g., an information item about the rotational position of the vehicle wheel, determined in the evaluating device. Additionally or as an alternative, the information signal can also contain information about second wheel-specific parameters. These second wheel-specific parameters can contain, e.g., the current tire pressure, the tire profile, the tire temperature, a longitudinal acceleration of the wheel, a transverse acceleration of the wheel etc. In addition, information can also be provided here which is used for wheel positioning such as, for instance, a frequency and/or amplitude modulation specific to the corresponding vehicle wheel, a serial number of the vehicle wheel contained in the transmitted information signal, and the like.

In a further preferred embodiment, a control device is provided which sends out the information signal in a predeterminable position of the vehicle wheel or a predeterminable angular range of the vehicle wheel. The sending out of the information signal can occur, e.g., on the basis of time and of angle of rotation. In this context, the information signal does not necessarily have to be sent simultaneously or immediately following its determination. Instead, it is sometimes even advantageous if the information signal is sent out at a time or angular range of the vehicle wheel advantageous for the sending out. It is particularly advantageous if the information signal is sent out in this manner within a range in which its vehicular reception is ensured and in which, for example, the vehicle wheel, and thus the wheel electronics unit provided therein, is not shaded by vehicular structures such as, for instance, the wheel housing or other chassis parts which would impair or possibly even prevent a vehicular reception. Since the precise rotational position was determined directly in the wheel electronics unit and is thus known, the communication to the vehicular receiving device can be improved, particularly with respect to the quality of the communication link, by the selective sending out of the information signals, on the one hand. In addition, energy can be saved also at the wheel electronics unit in this manner since the wheel electronics unit no longer has to send the transmitted information signals "randomly", as it were, to the vehicular receiving device. In particular, it is even possible here to dispense with multiple redundant transmission or an energy-consuming transceiving protocol. As an alternative, the transmit signals could be deliberately distributed to all angular ranges between 0° and 360°, e.g. by adding an arbitrary waiting time, thus ensuring that at least a particular proportion of the transmitted transmit signals are also received at the vehicle.

Besides that, it may also be advantageous if the control device sends out the information signal during one or more rotations of the wheel, for example 3 to 5 times. The multiple sending out can take place, for example, at statistically undefined times and rotational positions of the vehicle wheel. Due to the multiple sending-out of the information signal and the associated redundancy, on the one hand, and due to the undetermined, statistically freely selected times of the sending-out, on the other hand, it is additionally ensured that the information signal is transmitted, e.g., even more reliably to the vehicular receiving device.

In a preferred embodiment, the first sensor is constructed as position sensor or position switch. This first sensor is here designed for determining the current rotational position of a predetermined point on the vehicle wheel by detecting of known reference areas or reference points.

In an alternative embodiment, the first sensor can also be constructed as a magnetically sensitive sensor. Such a magnetically sensitive sensor is, e.g., a Hall sensor or a Reed switch. The magnetically sensitive sensor is designed for determining the current rotational position of the vehicle wheel by measuring a known magnetic field. This known magnetic field can be generated, for example, by an electromagnet or permanent magnet mounted on the chassis of the vehicle. This magnet is typically mounted at a known permanently predetermined position at the chassis of the vehicle, for example in the wheel housing. The sensor can also be designed for the evaluation of the earth's magnetic field in order to determine its rotational position.

In an alternative embodiment, the first sensor is constructed as a so-called inertial sensor. An inertial sensor can be, e.g., an acceleration sensor or shock sensor. By means of the acceleration sensor, it is possible to determine the current rotational position of a predetermined point on the vehicle wheel by means of an acceleration determined by an increase or decrease in the speed of the vehicle wheel. A shock sensor can be used for determining the derivation of the acceleration thus determined, and thus the current rotational position.

In a particularly preferred embodiment, the first sensor is constructed as piezoelectric sensor. The piezoelectric sensor is constructed for determining changes in the curvature of the tire of the vehicle wheel. In this context, the piezoelectric sensor can be constructed as deformation sensor, bending sensor, compression sensor and/or extension sensor depending on which change it is intended to detect.

In a preferred embodiment, the evaluating device is constructed for performing a gravitation-based evaluation of the measurement signals. In particular, the evaluating device can utilize a measured acceleration or the derivation of the measured acceleration for the gravitation-based evaluation.

In a likewise preferred embodiment, the evaluating device has a sampling device which samples this measurement signal for determining samples of the measurement signal which is typically present as an analog signal. The evaluation in the evaluating device is then carried out typically digitally, e.g. by means of the determined samples of the measurement signal.

In a preferred embodiment, a speed sensor is provided which determines the current speed of the vehicle wheel or of the vehicle. The sampling device is also constructed for performing an adaptive adaptation of the sampling times. This adaptive adaptation of the sampling times is carried out by the measurement signal being sampled in dependence on the determined speed of the vehicle wheel. The measurement signal is typically a measurement value depending on the vehicle speed and thus on the angular velocity of the vehicle wheel. By then performing an adaptive adaptation of the sampling time, these different speeds are taken into account. Thus, for example, a period of the measurement signal which corresponds to one rotation of the vehicle wheel is always measured by constant predetermined samplings. This increases the precision of the sampling and thus of the measurement, especially in the case of very large angular velocities of the vehicle wheel.

In addition or as an alternative, it would also be conceivable that the information about the current speed of the vehicle wheel or of the vehicle, respectively, is determined at the vehicle and conveyed to the wheel electronics unit via a vehicular transmitting device. In this case, the wheel electronics unit would also have to have a receiving device and evaluating device at the wheel, which can record and evaluate the signal transmitted by the vehicle in order to thus determine the speed. However, this consumes more circuitry and computing power.

In a preferred embodiment, the evaluating device has a filter device for filtering and thus for smoothing the measurement signal determined. In particular, a filter device having a constant, i.e. linear phase shift is preferably provided. Such a filter device with a constant phase shift can be preferably constructed as a Bessel filter. This embodiment of a filter facilitates the evaluation of the measured measurement signals since, as a result, it is known that the filtering is carried out independently of frequency.

In a likewise preferred embodiment, the evaluating device has a phase shifting device. By means of this phase shifting device, a phase shift generated by the filtering of the measurement signal can be reduced and preferably even completely compensated for. In particular, it is advantageously possible in conjunction with a filter device having a constant linear phase shift to reverse the latter again by means of the phase shifting device and thus to compensate for this. This is done, for example, by simply calculating out the known constant phase shift until the measurement signal is again present in the correct phase.

In a preferred embodiment, at least one second sensor is provided which is designed for determining second wheel-specific parameters. As has already been explained above, parameters which were required for determining the current rotational position were determined by means of the first wheel-specific parameters. By means of the second sensor, it is now possible additionally to determine further wheel-specific parameters such as, for instance, the current tire pressure, the tire temperature, the tire profile, an acceleration of the vehicle wheel and the like and to send it in the form of an information signal from the transmitting device at the wheel to the vehicular receiving device. In a particularly preferred embodiment, only a single sensor is provided which combines the functionalities of the first sensor and of the second sensor within itself. In particular, this is of advantage when, e.g., information which is not only required for determining the wheel position but which is also sent to the vehicular receiving device for further evaluation in the vehicle information device has already been measured by the first sensor. Such information can be, e.g., the acceleration of the vehicle wheel, gravitational information, the tire pressure and the like.

In one embodiment of the vehicle wheel according to the invention, the wheel electronics unit can be mounted, e.g., on the wheel rim. As an alternative, it would also be conceivable for the wheel electronics unit to be vulcanized into the tire of the vehicle wheel or clamped in in the interior of the tire casing, for example in the area of the tread by means of a clamping device especially provided for this purpose. It would also be conceivable to bond the sensor into the tread of the tire casing. As an alternative, a container can also be bonded into the tread into which the sensor is then inserted.

As a predeterminable rotational position of the vehicle wheel, one or more of the rotational positions can be selected from the following group:

reaching a predetermined angular position of the vehicle wheel with respect to the space surrounding the vehicle wheel;

contact area entry, that is to say the entry of a predetermined point on the wheel circumference of the vehicle wheel into the wheel footprint (the so-called contact area);

contact area exit, i.e. the exit of a predetermined point on the wheel circumference of the vehicle wheel into the wheel footprint;

contact area center or lowest position of the vehicle wheel, respectively, i.e. where a predetermined point on the wheel circumference of the vehicle wheel which is in the center of the wheel footprint is reached;

where the top position of the vehicle wheel is reached;

3 o'clock position or 9 o'clock position, i.e. where a position of the vehicle wheel between the top position of the vehicle wheel and the bottom position of the vehicle wheel or the center of the wheel footprint, respectively, is reached.

Besides that, any other fixedly predetermined rotational position is naturally also possible. As an alternative, it would also be possible for the wheel electronics unit to send out the information signals with respect to arbitrary rotational positions, but the transmission of the information signals to include information about the current rotational position of the vehicle wheel at which the information is currently being sent. This does not require the detection of a dedicated wheel position but the continuous determination of the current rotational position.

The above embodiments and developments can be arbitrarily combined with one another inasmuch as that is appropriate. Further possible embodiments, developments and implementations of the invention also comprise combinations, not explicitly mentioned, of features of the invention described with respect to the exemplary embodiments previously or in the text which follows. In particular, the expert will also add individual aspects as improvements or supplements for the respective basic form of the present invention.

In the text which follows, the present invention will be explained in greater detail by means of the exemplary embodiments specified in the figures of the drawing, in which:

BRIEF DESCRIPTION OF THE SEVERAL VIEWS OF THE DRAWING

FIG. 1 shows a diagrammatic representation of a vehicle equipped with a tire information device according to the invention;

FIG. 2 shows various rotational positions of a predetermined point, e.g. the wheel electronics unit, on a vehicle wheel;

FIG. 8 shows a measurement signal superimposed on a noise signal;

FIG. 11 shows the variation in the field strengths of the transmit signals sent out by the four wheel electronics units of the vehicle wheels;

DESCRIPTION OF THE INVENTION

Figure 1A:
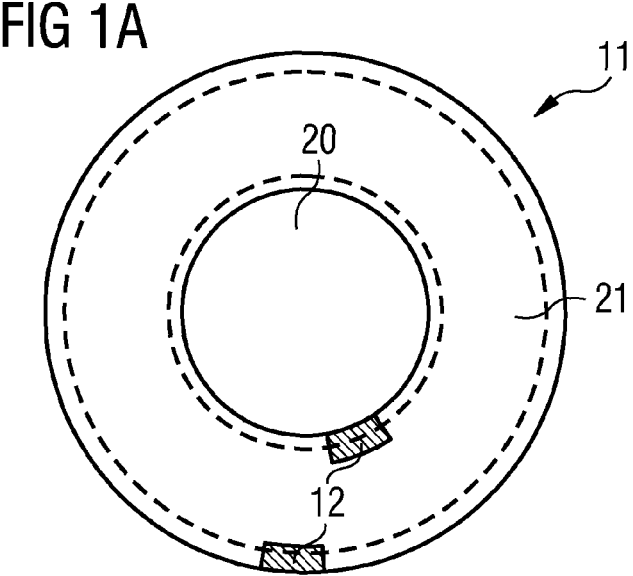
FIGS. 1A, 1B show a diagrammatic representation of a vehicle wheel according to the invention and of a wheel electronics unit according to the invention.

Unless otherwise specified, identical and functionally identical elements are in each case provided with the same reference symbols in the figures of the drawing.

FIG. 1 shows a diagrammatic representation of a vehicle equipped with a tire pressure control device. The vehicle, here designated by the reference symbol 10, has four wheels 11. To each wheel 11, a wheel electronics unit 12 is allocated. At the vehicle, a transmitting/receiving unit 13 which, e.g. is in communicative connection with the wheel electronics unit 12 allocated to it in each case, is allocated to each of these wheel electronics units 12. Together, the wheel electronics units 12 and transmitting/receiving units 13 are a component of a tire information device which, in addition, has a central controller 14. This controller 14 also has a program-controlled device 15, for example a microcontroller or microprocessor, and a storage device 16, for example a ROM or DRAM. In addition, the vehicle 10 has a driver information system 17.

Figure 1B:
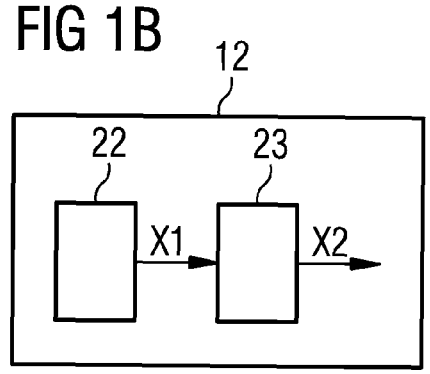

FIG. 1A, 1B show diagrammatic representations of a vehicle wheel according to the invention or, respectively, of a wheel electronics unit according to the invention which can be used, e.g., in the vehicle from FIG. 1.

The vehicle wheel 11 shown in FIG. 1A has a rim 20 on which a wheel tire 21 is mounted in a familiar manner. The wheel electronics unit 12 can then be mounted directly on the rim 20, for example in the area of the valve. In addition, it would also be conceivable if the wheel electronics unit 12 is mounted in the area of the tread in the interior of the wheel tire 21, for example by using a clamping device. Finally, it would also be conceivable if the wheel electronics unit 12 is vulcanized into the rubber material of the wheel tire 21.

The wheel electronics unit 12 shown in FIG. 1B has in a minimum variant a sensor 22 which is designed for picking up a measurement signal X1 which has at least one first wheel-specific parameter. This measurement signal X1 is supplied to an evaluating device 23 which is designed for determining a current rotational position of this wheel electronics unit 12 with respect to the associated vehicle wheel 11 from the measurement signal X1. The evaluating device 12 provides at its output an information signal (X2 which contains an information item about the transmitted rotational position of the vehicle wheel 11 and possibly of further wheel-specific parameters.

Figure 1C:
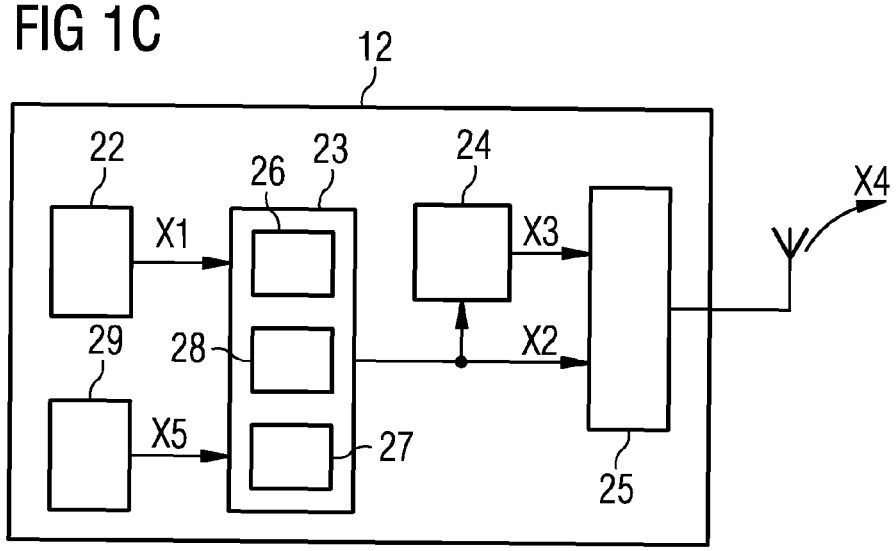
FIG. 1C shows a preferred exemplary embodiment of a wheel electronics unit according to the invention in a block diagram representation.

FIG. 1C shows a preferred exemplary embodiment of a wheel electronics unit 12 according to the invention. Apart from the first sensor 22 and the evaluating device 23, a control device 24 and a transmitting device 25 are also provided here. The control device 24 picks up the information signal X2 generated by the evaluating device 23 and, in dependence thereon, controls the transmitting device 25 with a control signal X3. For example, the control device 24 can specify, in dependence on the information signal X2, the times at which the transmitting device 25 should send the information signal X2 or a signal derived therefrom. The transmit signal sent out by the transmitting device 25 is designated here by X4.

Apart from the first sensor 22, the wheel electronics unit 12 has here at least one second sensor 29 which determines second wheel-specific parameters such as, for example, the tire pressure or the tire temperature, and, in dependence thereon, supplies a further information signal X5 to the evaluating device 23. In addition, the evaluating device 23 preferably has a sampling device 26, a filter 27 and a phase shifting device 28. Via the sampling device 26, the analog information signal X1, X5 generated by the first sensor 22 and the second sensor 29, respectively, is sampled. The information signal X1, X5 is filtered via the filter device 27 before or after the sampling and in the phase shifting device 28, a phase shift generated via the filter device 27 is compensated for or at least reduced.

One concept forming a basis for the present invention consists in providing a wheel electronics unit 12 which determines a rotational position of the wheel electronics unit 12 with respect to the vehicle wheel 11 and, at the rotational position thus determined, or in dependence on the rotational position at a defined different position, e.g. based on time or angle, transmits the wheel-specific parameters, determined by the wheel electronics unit 12, to a vehicular receiving device 13. In this respect, FIG. 2 shows some special positions 30 with reference to the road surface 31 on which the vehicle wheel 11 is resting. For example, a top position a, a contact-area entry b, a contact-area exit c, a contact-area center or bottommost position d, a 3 o'clock position e or a 9 o'clock position f can be provided. Naturally, any other fixed position 30 which is not shown in FIG. 2 would additionally also be conceivable.

In practice, it sometimes happens that a wheel orientation or predetermined wheel position cannot be determined, e.g., very noisy signals are present. This occurs, e.g., if a street on which the vehicle is travelling has pronounced irregularities. If no orientation or wheel position can be detected or alternatively a time limit is exceeded during the detection, this should be recorded in the wheel electronics unit. As a rule, a radio message is always sent as well in this case in order to send current information about the tire such as, e.g., the tire inflation pressure, to the controller for monitoring. It is then necessary here that the wheel electronics unit provides an indication in the message or in the transmit signal (X4) that this is a non-orientation-related emission. This is usually implemented by setting a bit to one or zero in the message of the transmit signal (X4). This bit is also known as synchronization flag. Thus, only the transmitted information is processed in the controller, but the radio transmission time is not evaluated for positioning.

In the text which follows, the mode of functioning and operation of the wheel electronics unit and the sensor contained therein is described:

1. Waiting for a transmission time provided for the transmission of a transmit signal and the message correspondingly contained therein (so-called emission). Since the wheel electronics unit is not transmitting continuously and the radio regulations often prescribe a minimum spacing between two successive emissions, the wheel electronics unit must wait for a predetermined time interval for the next emission, e.g. every 15 sec.

2. Detection of a predetermined wheel position or rotational position (e.g. angular position of the wheel) at which the next transmit signal (transmit message) is to be transmitted. As an alternative, a current wheel position can also be determined in each case which is then additionally sent in the transmit message.

3. If it has been possible to determine a predetermined or rotational wheel position, a synchronization flag is set to 1. Otherwise, the synchronization flag is set to 0.

4. Transmitting the transmit signal with the transmit message.

5. Return to step 1.

This ensures that needed data from the tire sensor are also sent when it was not possible to determine the wheel position.

For the detection of the rotational position 30 or of the rotational angular position, respectively, various approaches can be considered for rim-mounted and also for tire-mounted wheel electronics units 12:

The wheel electronics unit 12 determines its rotational position 30 by means of its position in the wheel housing. Thus, e.g., a magnet can be mounted in each wheel housing. When the tire electronics unit 12 comes into the vicinity of the magnet, this can be detected, e.g. via a Hall sensor, Reed switch or the like. This provides a fixed reference position for the sensor. As an alternative, a part present in the wheel housing in any case could possibly also be detected, such as, e.g., the shock absorber.

The wheel electronics unit 12 determines its rotational position 30 with the aid of a special position sensor or a position switch. Position sensors (also position control sensors) determine by means of measurements of reference fields or reference points (e.g. a magnetic field in the area of the wheel housing) the position and orientation of the vehicle wheel 11 in three-dimensional space, in most cases relative to the vehicle 10 or the roadway 31.

In the case of tire-integrated (compared with rim-based) wheel electronics units 12 which, e.g., are mounted on the inside of the tread of the tire 21 (see FIG. 1A), there is the additional possibility of detecting the contact-area entry or exit. This can be achieved, e.g., with the aid of acceleration or shock sensors. An acceleration sensor is a sensor or feeler which measures the acceleration by determining the force of inertia acting on a test mass (e.g. the vehicle wheel or the rim). It is thus possible to determine, e.g., whether there is an increase or decrease in speed. The acceleration sensor belongs to the group of inertial sensors. Such inertial sensors are used for measuring linear acceleration forces and forces of rotation.

However, piezoelectric sensors can also be used which measure changes in the curvature of the tire. In this case, either pressure-sensitive piezoelectric sensors can be used or piezoelectric sensors which detect a deformation of the piezoelectric stack, for example a bend, stretching, compression etc. Peizoelectric sensors have the additional advantage that their output voltage can be used as trigger signal for the control device of the wheel electronics unit 12. As a result, active continuous interrogation of the sensor 22 is unnecessary, which prevents a high energy consumption. This is advantageous since the sensors provided within the wheel electronics unit need an independent power supply, e.g. a battery, an accumulator, an energy generator or the like. It is particularly advantageous if a piezoelectric sensor provided in any case, e.g., for pressure measurement for the contact-area position, is additionally used for supplying power to the tire electronics unit.

Figure 3:
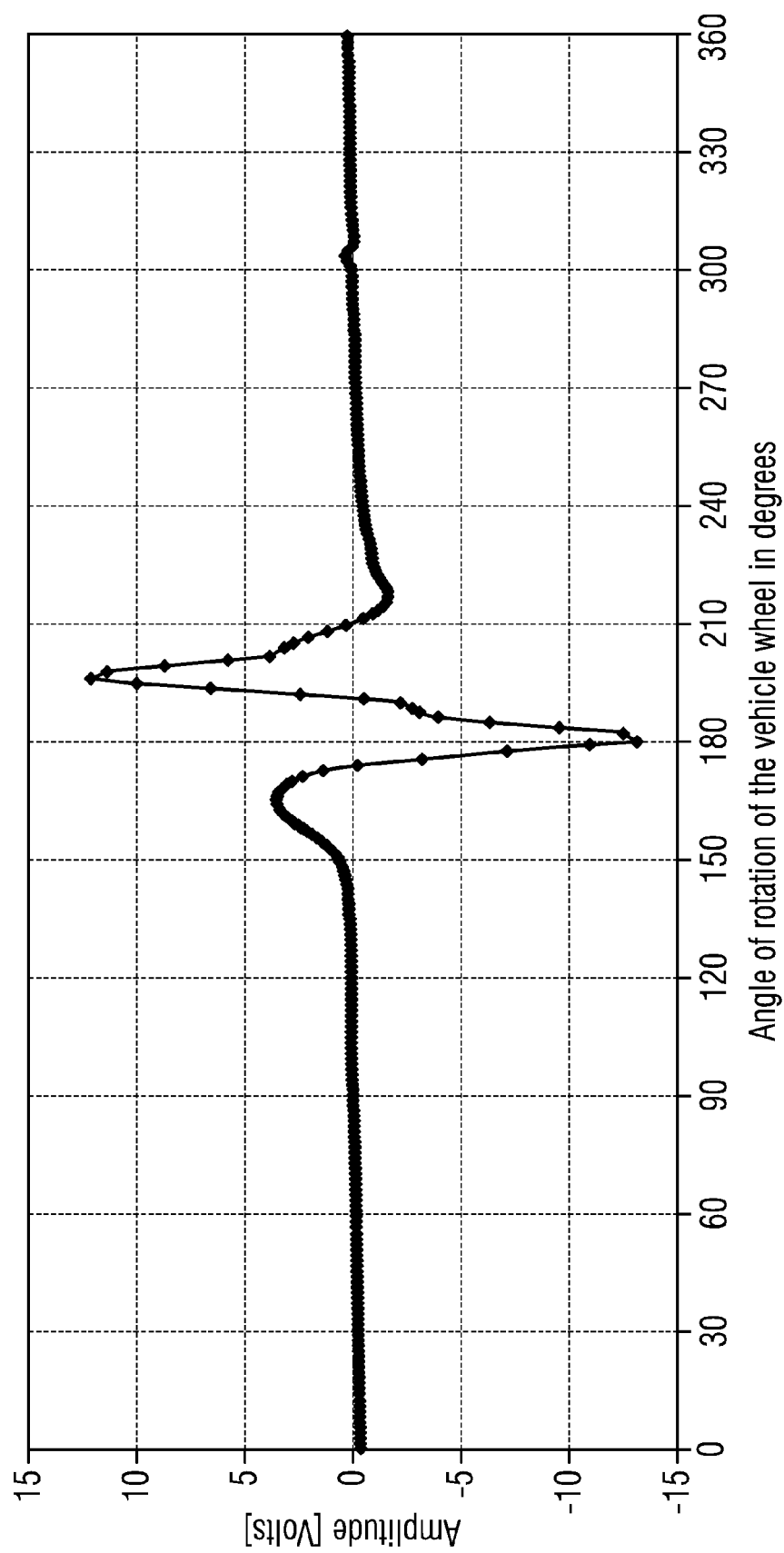
FIG. 3 shows the variation of a measurement signal of a piezoelectric sensor mounted on a vehicle wheel.

FIG. 3 shows the variation in a signal picked up by a piezoelectric sensor which is mounted in the vehicle wheel. This measures the deformation of the tire on the inside of its tread. The peaks in the measurement signals picked up identify the contact-area entry and exit, respectively, of the sensor. These positions can be determined by means of a peak detection.

This is possible, e.g., by means of simple threshold monitoring or minimum and maximum detection.

Figure 4A:
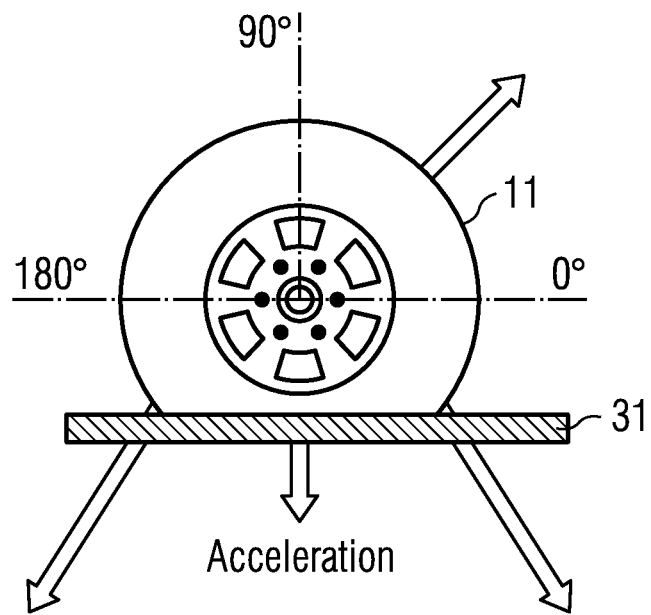
FIGS. 4A, 4B show diagrammatically the variation of an acceleration sensor with respect to various rotational positions of a vehicle wheel.
Figure 4B:
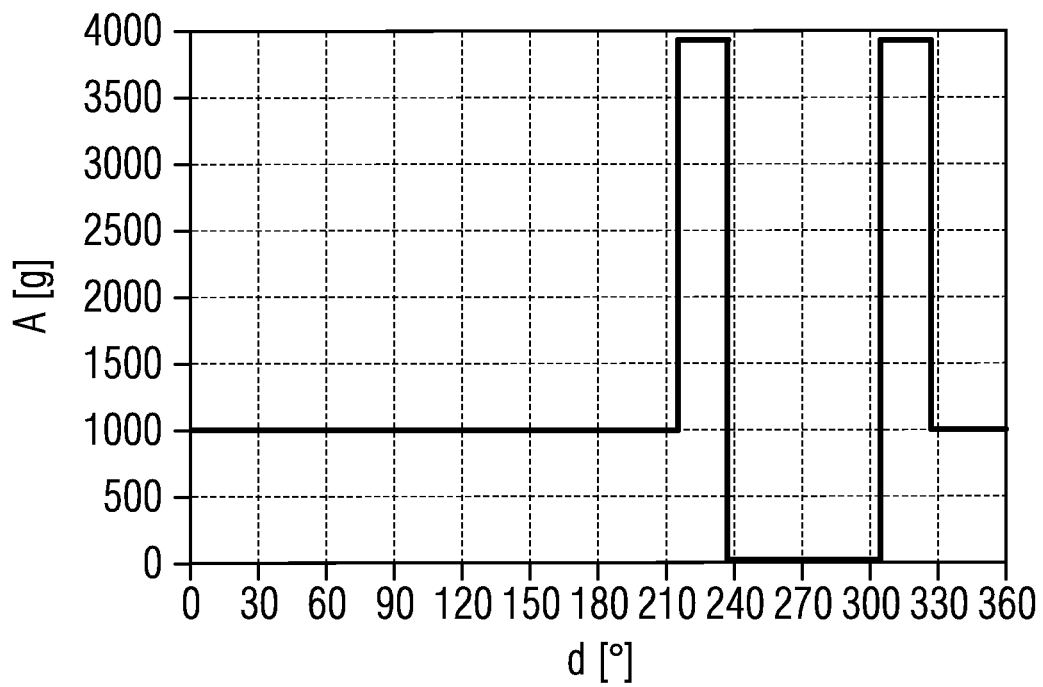

FIGS. 4A, 4B diagrammatically show the variation of the measured acceleration A of an acceleration sensor which is mounted on the tread in the tire, in dependence on the angle of rotation of the vehicle wheel α. Strong peaks can be seen in the measured signal when the sensor enters into (position b) or leaves (position c) the contact area, that is to say at 240° and 300°, respectively. It is thus possible to determine these positions b, c, here, too, as follows.

Evaluation of the longitudinal acceleration (acceleration/deceleration) of the vehicle with an acceleration or shock sensor in the tire electronics unit: e.g., the top position a, the bottom position d, the 3 o'clock or 9 o'clock positions e, f can thus be detected. However, as a rule, the accelerations occurring are small and also occur only in dependence on the driving situation.

Evaluation of the projection of the gravitation vector onto an acceleration or also shock sensor in the tire electronics unit: depending on the evaluation of the resultant sine wave (search for maximum, search for minimum, zero transition search), the topmost or bottommost position a, d and the 3 o'clock or 9 o'clock position e, f can be determined, for example. These accelerations occur with each rotation and can be used in an easily reproducible manner.

Figure 5:
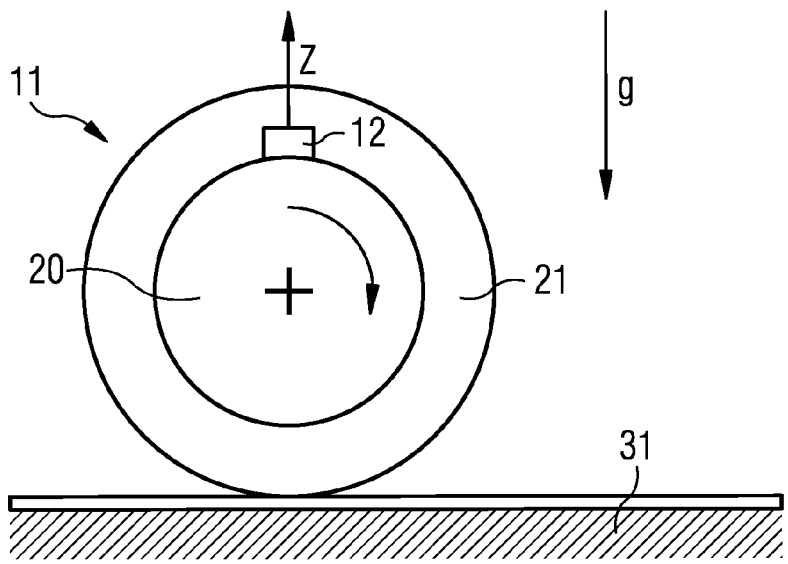
FIG. 5 shows a sensor for a rim-based wheel electronics unit.
Figure 5A:
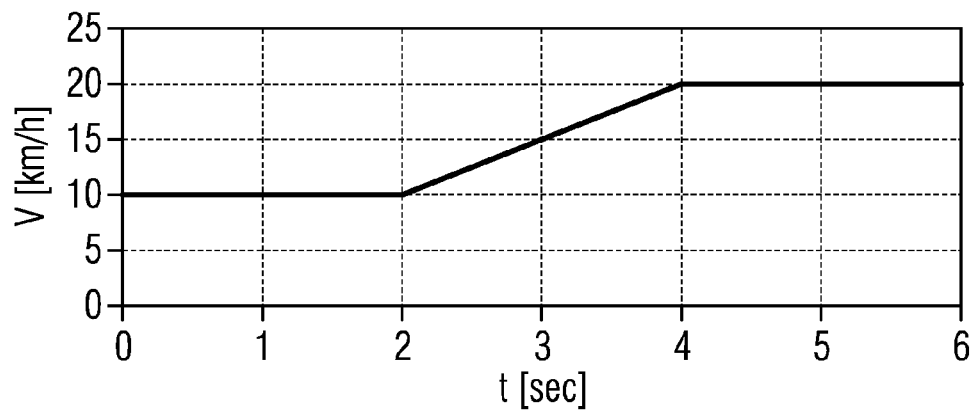
FIGS. 5A, 5B show the speed and acceleration in dependence on time for a rim-based wheel electronics unit according to FIG. 5.
Figure 5B:
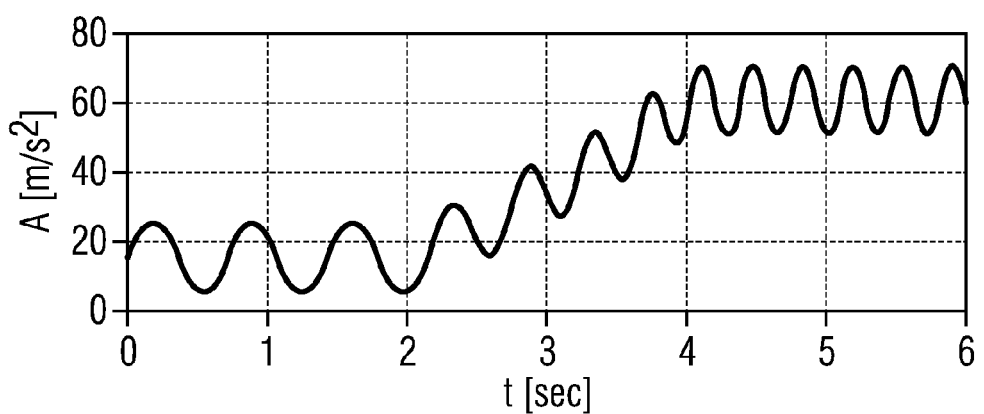

The tire sensor with acceleration sensor is acted on in the z direction (i.e. radially), on the one hand, by the centrifugal acceleration which is caused by the rotational movement of the vehicle wheel and, on the other hand, the gravitation. In the text which follows, the gravitation-based evaluation of the measurement signal is explained:

FIG. 5 shows a sensor for a rim-based wheel electronics unit which, however, can also be used for tire-based wheel electronics units. It can be seen that the velocity V causes a large direct component in the acceleration signal A (see FIG. 5A, 5B) and that an oscillation having the amplitude of about 1 g is modulated onto the acceleration signal (FIG. 5B). It can also be seen that the frequency of the oscillations also depends on the vehicle speed. The greater the vehicle speed the greater the frequency of rotation of the wheel and the smaller will be the rotational time for one rotation. The position within these oscillations can be used for reading out the rotational position of the sensor. For this purpose, various methods will be described in the text which follows.

As an alternative to an acceleration sensor, a shock sensor can also be used. This does not measure the acceleration but its derivation. In the case of a shock sensor, in comparison with the curve in FIG. 5B, the derivation curve would generate an oscillation free of mean value which, however, also has changing periods of oscillation. The period is identical with the period of the signal measured by the acceleration sensor.

Accordingly, defined positions of the signal of the shock sensor can then also be determined. In contrast to the acceleration sensor, no absolute information about the value of acceleration can be produced.

Figure 6:
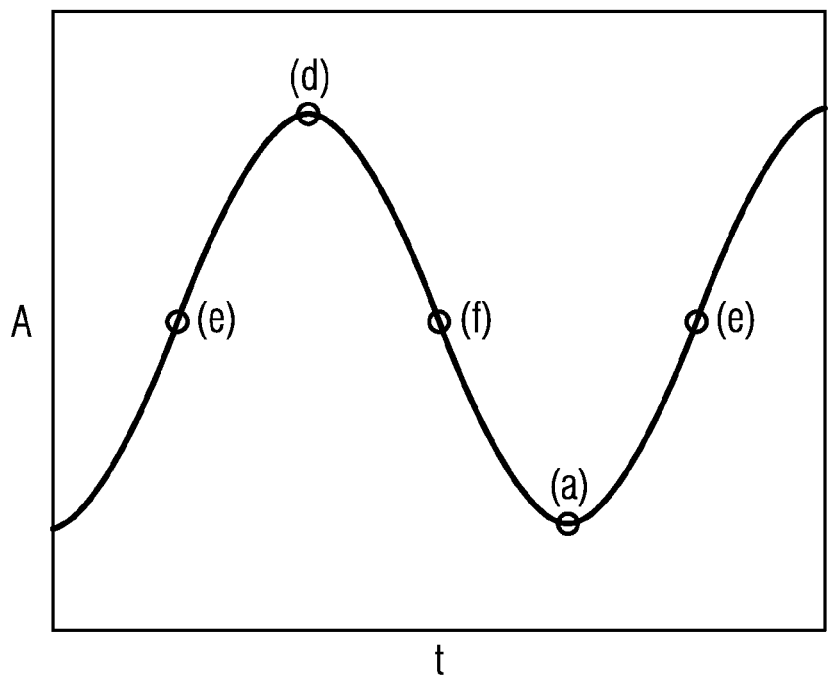
FIG. 6 shows a complete oscillation of a measurement signal recorded by an acceleration sensor.

FIG. 6 shows a complete oscillation of a measurement signal picked up by an acceleration sensor.

For the detection of the rotational positions, the oscillation picked up must be evaluated. In this context, e.g., the positions shown in FIG. 2 correspond to the following positions of the oscillation of the acceleration sensor. Position d in FIG. 6 is defined, e.g., as the local maximum, position a as the local minimum and positions e and f are characterized as rising and falling zero transitions, respectively, of the oscillation. These positions can be specified in that the acceleration values of the curve are sampled and evaluated. During this process, it is necessary that the curve is sampled often enough in order to reproduce the required position with sufficient accuracy.

Figure 7:
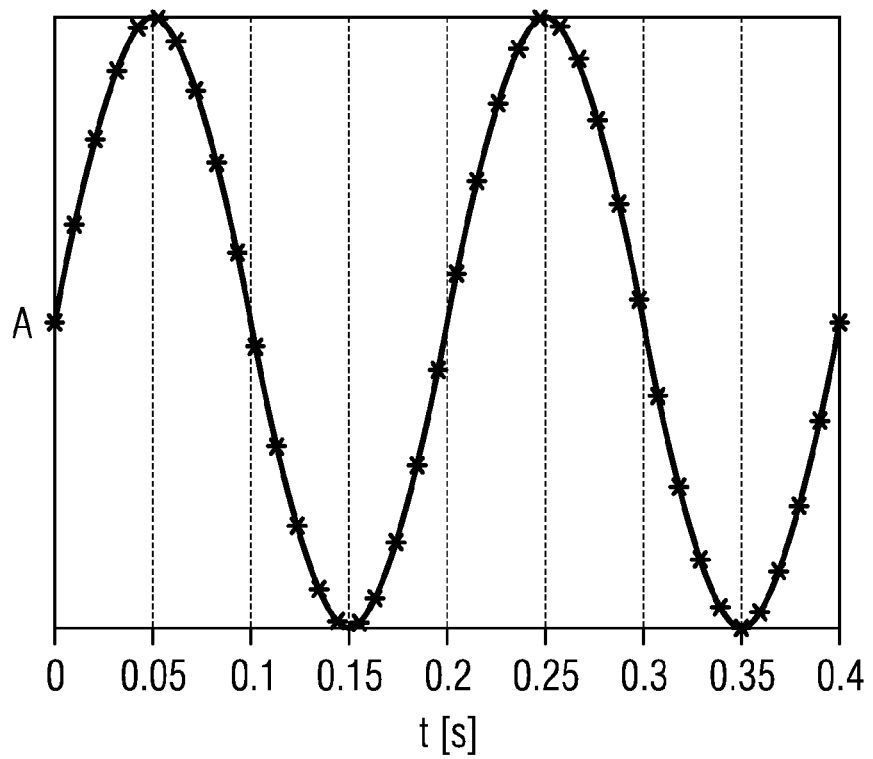
FIG. 7 shows a typical sampling scenario for the oscillation of a measurement signal recorded by an acceleration sensor.

FIG. 7 shows a typical sampling scenario. The oscillation can be resolved with sufficient accuracy if one period is sampled with approx. 10-30 values.

Figure 7A:
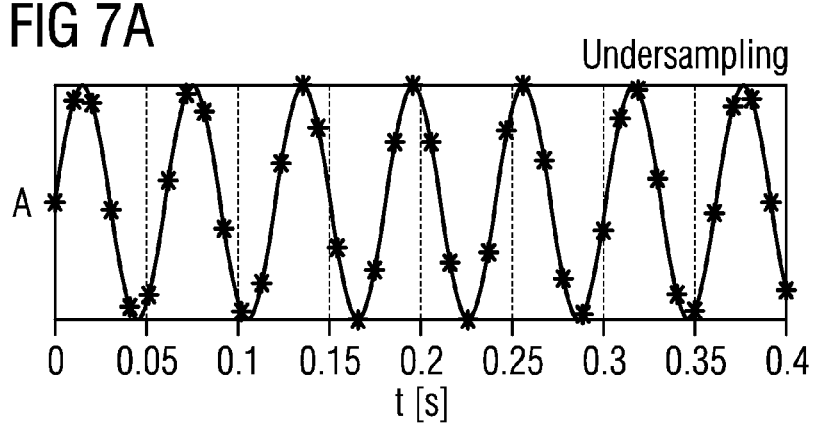
FIGS. 7A, 7B show over- and undersampling of a measurement signal recorded by an acceleration sensor.
Figure 7B:
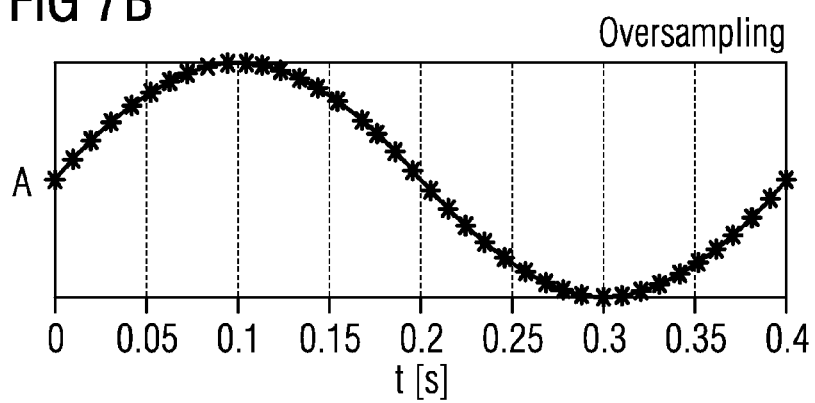

FIGS. 7A, 7B show how the period of the oscillation depends on the speed of the vehicle or of the wheel, respectively. With a constant sampling time, it follows that the oscillation is under- and oversampled in different speed ranges. Undersampling (FIG. 7A) generally leads to an impaired detection of the rotational positions defined. Oversampling (FIG. 7B) leads to an increased memory space requirement for the sampled values for one oscillation and to an increased energy requirement since each sampling means in each case one read-out of the acceleration sensor. Since the wheel electronics unit is supplied either by means of a battery or by a power generator and the available energy is limited, this is not desirable.

Figure 7C:
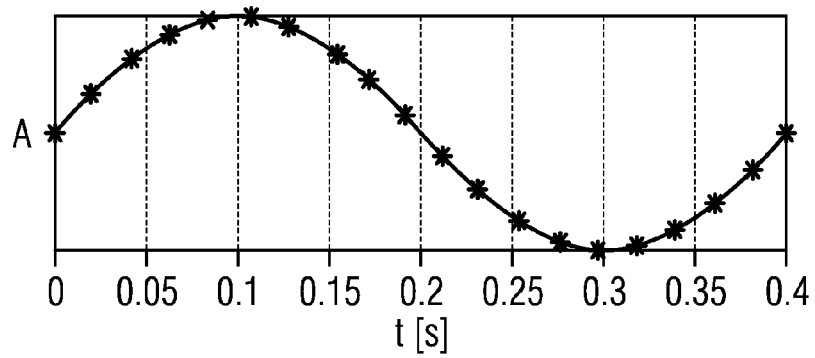
FIGS. 7C, 7D show an adaptive sampling in the case of the signals from FIGS. 7A, B.
Figure 7D:
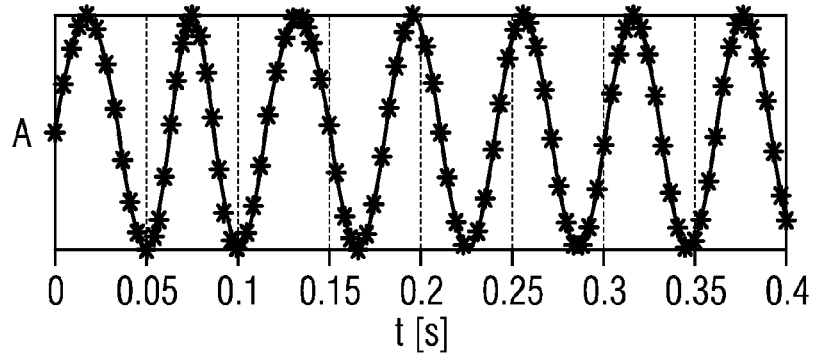

An adaptive choice of the sampling time as shown in FIGS. 7C, 7D is therefore particularly advantageous. The sampling time is defined in accordance with the speed of the vehicle and in accordance with the period of the oscillation. The sampling time is determined by evaluating the absolute value of the acceleration value (centrifugal component plus oscillation modulated on). The centrifugal component and the period of oscillation depend on the rotational speed of the vehicle wheel. If the absolute values of the acceleration are not present since, e.g., a shock sensor is used, it is possible to determine the period of the oscillation in a first step, e.g. by looking for zero transition and, on the basis of that, specifying the sample time. The two methods are based on the fact that the periods of oscillation do not change abruptly but only slightly during a few wheel rotations. Since a vehicle can accelerate or decelerate only within a limited extent, this method is also permissible. Furthermore, the oscillation can still be resolved sufficiently well if the number of samples per period is within a particular permissible range. This is also essential since the sampling time cannot be selected completely freely in practice but only certain values can be set (due to the timing of the wheel electronics unit).

The position detection, e.g. the detection of the peak of the oscillation is easily possible by means of the samplings as shown in FIGS. 7-7D. It is also possible to use simple algorithms for searching for the maximum, the minimum or the zero transition. In reality, however, there are measurement signals on which noise is superimposed so that filtering of the measurement signal is necessary before the sampling and evaluation.

FIG. 8 shows a measurement signal on which a noise signal is superimposed. The dashed line shows the basic analog measurement signal formed as a sinusoidal signal. The samples in FIG. 8 contain the superimposed noise.

Figure 8A:
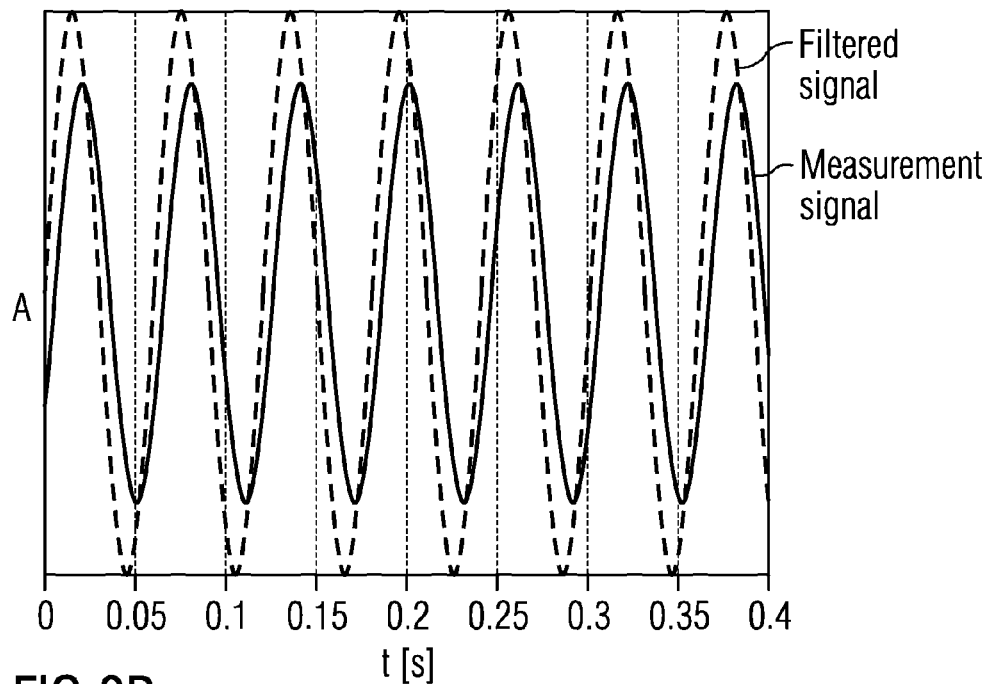
FIGS. 8A-8C show various phase shifts, generated by filtering, in a measurement signal.

Filtering the measurement signal produces smoothing which makes it possible again to evaluate and thus detect the desired rotational position. However, filtering has the mostly unwanted side effect of a phase shift. This is shown in FIG. 8A by means of sinusoidal oscillation (without noise). FIG. 8A shows that the filtering influences the amplitude of the oscillation in that the oscillation is delayed and thus shifted. However, this has no influence with respect to determining position within the oscillation as long as the oscillation can be resolved well with respect to amplitude. It is only the phase offset which is relevant. In general, this phase offset would be insignificant for the detection behavior since the position detected is always the same in the case of a selected filter. However, this only applies to a fixed frequency of oscillation. In a real driving scenario in which different speeds and therefore different frequencies of oscillation are present, this leads to different phase offsets and thus to problems.

Figure 8B:
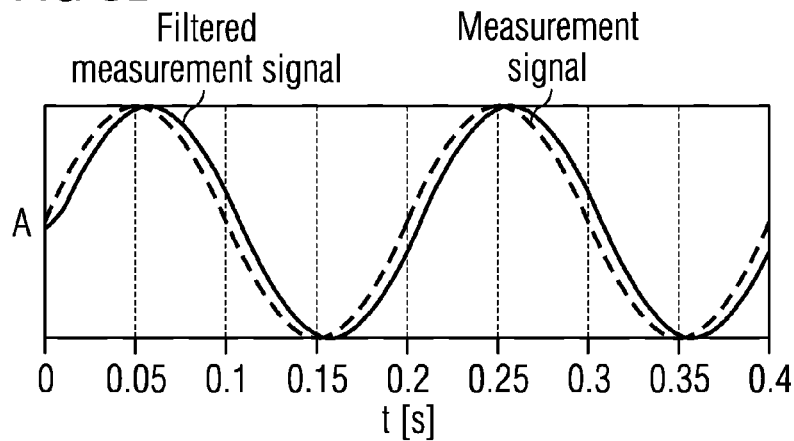
Figure 8C:
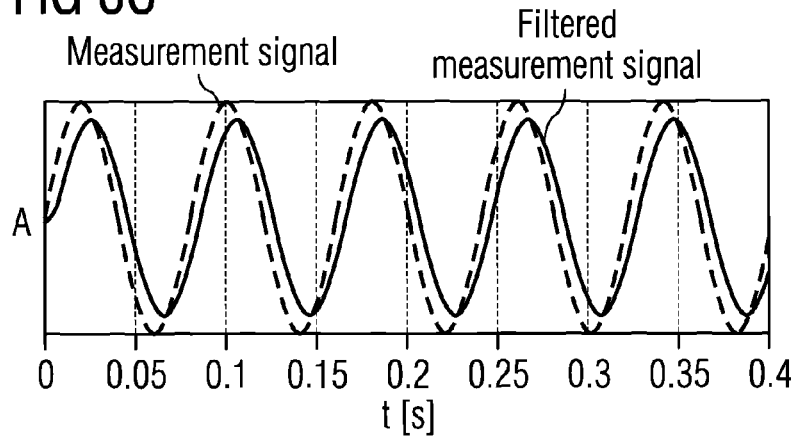

A detection (e.g. of the maximum), by means of the continuous lines in FIG. 8B, 8C leads to different positions of the dashed initial oscillations. For example, the angular offset is significantly higher in FIG. 8C. This is due to the fact that the phase offset is dependent on the frequency of oscillation. Theoretically, a detection algorithm could determine and compensate for the respective phase shift, on the basis of the current frequency. However, this requires accurate knowledge of the frequency of oscillation and consumes computing power at the expense of energy resources.

In principle, there are two possibilities for bypassing the phase shift:

On the one hand, the input signal could be filtered twice, once forward in time and then backward in time by using the same filter. The phase shift obtained by the first filtering is eliminated by the second filtering, so that the final output signal has no further phase shift. However, the input signal and the intermediate result must first be stored so that it then can be filtered backward in time. This requires additional memory space and also leads to the position to be detected being detectable only after a relatively long processing time. That is to say, an evaluation of a measurement signal picked up by the wheel electronics unit close to the time when passing through the position to be detected is scarcely achievable. The second filtering additionally also doubles the effective order of the filter.

Figure 9A:
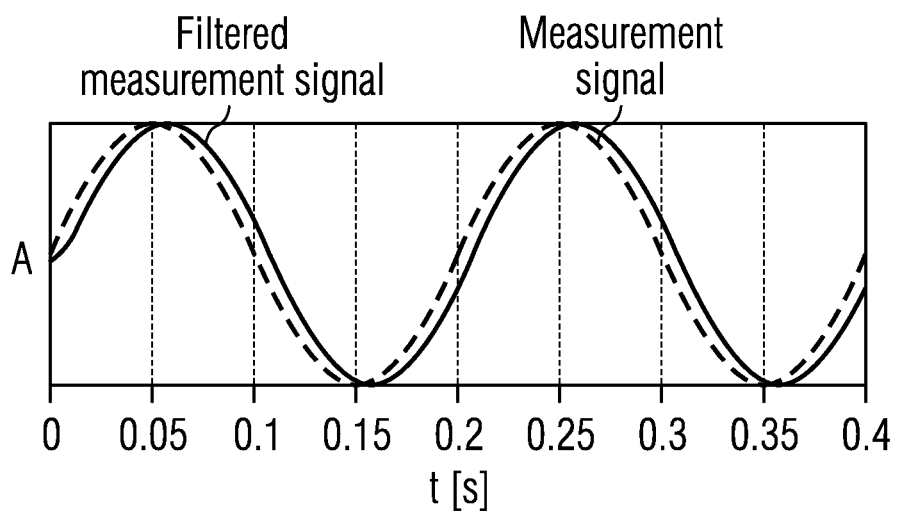
FIGS. 9A, 9B show in an exemplary manner the influence of a Bessel filter on the measurement signal recorded by an acceleration sensor, in dependence on time.
Figure 9B:
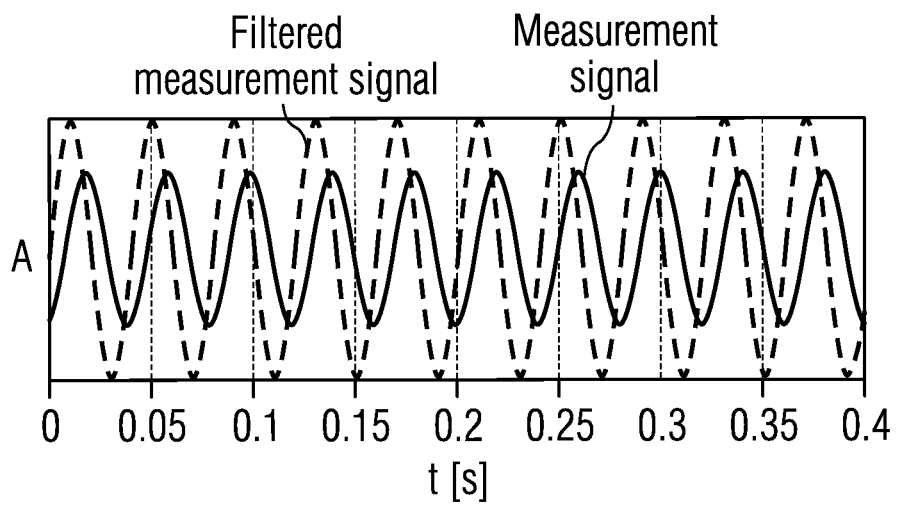

As an alternative, it would be advantageous to use filters which (approximately) have a constant phase shift over the frequency range of interest to the evaluation. Such filters are, e.g., Bessel filters which are linear in phase. This leads to a constant-time displacement of the filtered measurement curves for all input frequencies. It is thus possible to take this constant shift into consideration with all measurement signals picked up by the sensors and to compensate for it via a calibration algorithm in the vehicular controller. FIGS. 9A and 9B show by way of example the behavior of a Bessel filter. The variation is characterized in such a manner that the time difference, e.g. of the maxima of the input signal and of the maxima of the filtered signal is approximately equal.

Figure 10A:
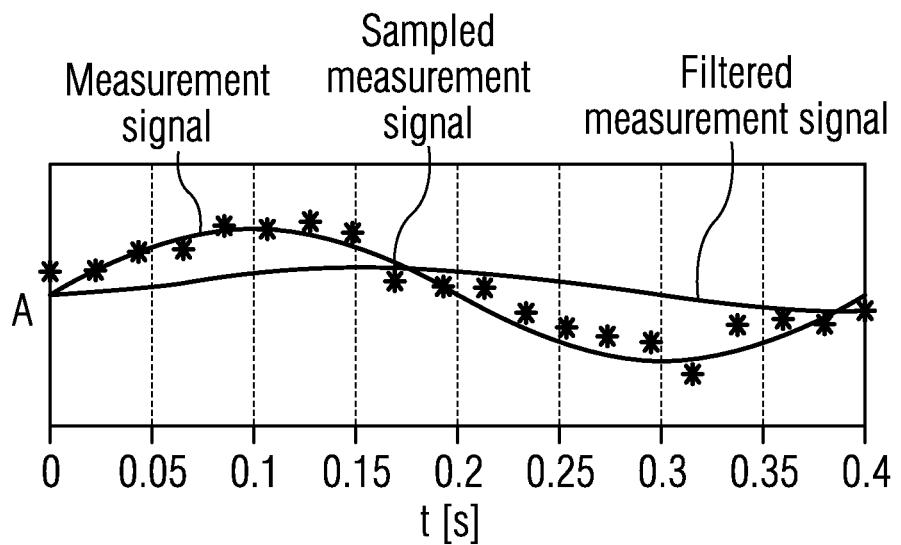
FIGS. 10A, 10B show in an exemplary manner the signal variations of the acceleration signals recorded by an acceleration sensor in dependence on time, with sampling and filtering.
Figure 10B:
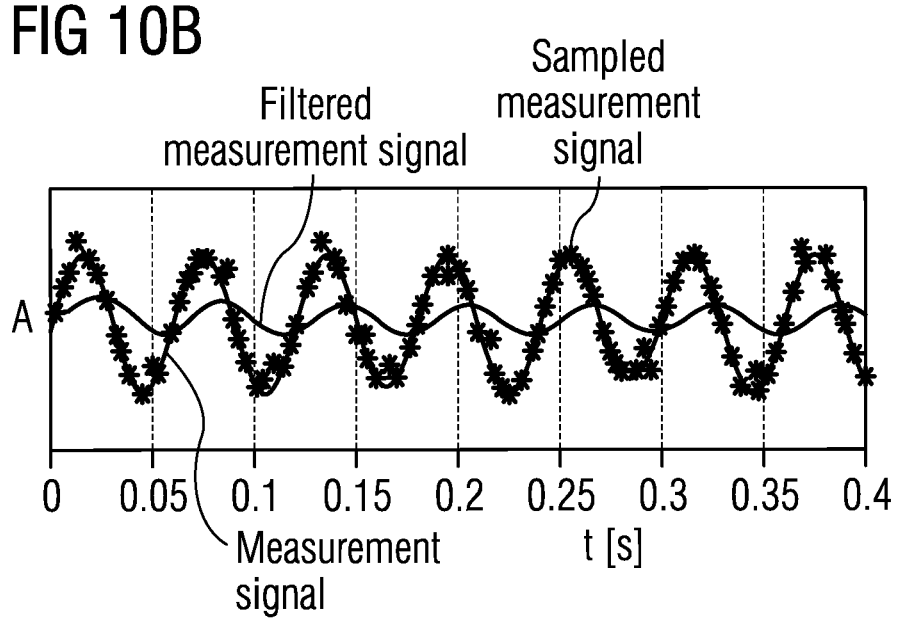

The problem of the phase shift can be solved most elegantly by using an adaptive sampling time and filtering the sampled signal in a sampling-based manner (see FIGS. 10A, 10B). This eliminates the dependence of the original time vector. FIGS. 10A, 10B show that the filtered signal intersects the original measurement signal at the same point in both cases which allows a constant delay with respect to phase (i.e. of the angle) and not in time to be inferred. If, e.g., the maximum of the filtered signal is detected, this is located in the same phase of the input signal in FIG. 10A and FIG. 10B. The delay in the form of a constant phase—independently of the speed traveled or frequency of oscillation, respectively—has the advantage that a detection of the rotational position is simply shifted by a constant angular position. Since in the positioning method it is not a matter of the absolute positions but only of relative relationships, this characteristic is very advantageous and the algorithm does not need to be adapted.

There are so-called "black spots" in the transmissions of the transmit signals. These are angular positions of the vehicle wheel at which a reception of a complete transmit signal (the so-called message) by the vehicular receiver is difficult or not possible at all. This is a attributable to the fact that the radio link between the vehicle wheel and chassis of the vehicle is impaired, e.g. by chassis parts such as, for instance, the wheel housing.

FIG. 11 shows the variation of the field strengths E of the signals received by the wheel electronics units of the four wheels. It can be seen that the field strengths E depend greatly on the wheel angle positions $\alpha$. If then, e.g., the necessary threshold for correctly receiving a transmit signal is about 85 dBm, the signal sent by the wheel electronics unit of the front left-hand wheel cannot be received at a position of approx. 190°. If, however, it is intended to transmit especially always at this position or, e.g., at 180° (the wheel continues to rotate during the transmitting) a reception of this transmit signal would not possible.

Figure 12:
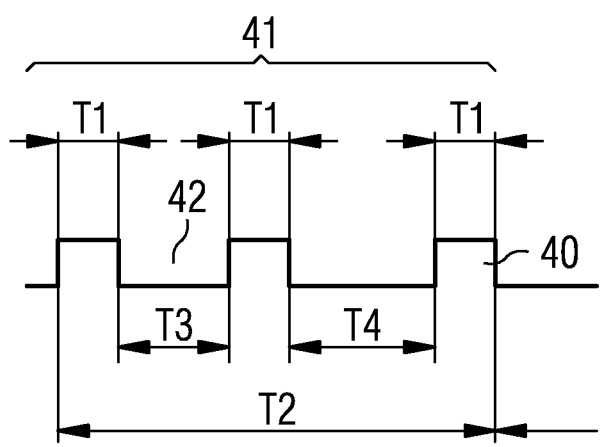
FIG. 12 shows the subdivision of a signal, sent out by a wheel electronics unit, in a number of frames which overall form a burst.

It is, therefore, occasionally advantageous to not always emit transmit signals at the same rotational position but, e.g., to build in an arbitrary, statically distributed delay. In this context, a dedicated position will always still be detected but after the detection a certain time will be allowed to pass. For the sending out of the transmit signal then taking place, the waiting time sent along as information so that the receiving unit can calculate this waiting time out again. The waiting time can either be time-based or angle-based, e.g. depending on what can be implemented better in the wheel electronics unit with respect to the sequence of the algorithm. Thus, e.g., an identical number of sampling intervals in the case of an adaptive sampling time corresponds in good approximation to an angle-based delay. When choosing delay times, a predetermined set of values is expediently one which is either gone through one by one during the emissions or from which a random selection is made. It is thus possible to distribute the sending out of the signals statistically uniformly over the entire 360° of a vehicle wheel. In practice, it may happen time and again that individual transmissions are not received correctly, e.g. because of radio interference or deletions by transmit signals from other wheel electronics units. For this reason, it is occasionally advantageous to send the information of the wheel electronics units redundantly. Accordingly, individual frames of transmit signals are sent which contain identical information. FIG. 12 shows how three frames 40 with a duration of T1 form a so-called burst 41 with a duration of T2 of a transmitted measurement signal. Between the individual frames 40 of a burst 41, there are predefined pauses of different or equal duration T3, T4 which are also intended to ensure again that the frames are distributed as uniformly as possible over the wheel circumference of 360°.

As part of the position-related transmitting of the tire electronics units it is therefore necessary to adapt this method. It is necessary to be able to calculate back to the original detection of the position from the reception of only one or two of the frames of a burst. For this purpose, it is necessary that each frame carries an information item at what number frame this is within the burst. In addition, it is naturally also necessary to contain the information item of the delay time described in the previous paragraph in each frame. Having this knowledge and the knowledge about the pause times between the frames, it is then possible to calculate back progressively to the original detection point and thus to the rotational position.

Although the present invention has been described above by means of preferred exemplary embodiments, it is not restricted to these but can be modified in many ways.

It is possible to use known methods, for example direct-measuring tire pressure determination systems for determining the tire pressure. Direct-measuring systems determine, e.g. by means of a suitable pressure sensor, the tire pressure prevailing in the tire directly. Indirectly-measuring systems determine, for example, the transverse or longitudinal acceleration of a tire and derive therefrom the tire pressure. In addition, the tire pressure can also be determined by evaluating revolution or vibration characteristics of the vehicle wheels.

In addition, the present invention is not necessarily restricted to a tire information device used in a passenger car. Instead, the invention can likewise also be used advantageously in any vehicle such as, e.g., trucks, motor cycles, buses, trailers of vehicles and the like.

The construction of the tire information device, especially with regard to the number of wheel electronics units used, transceiving devices, the construction of the program-controlled device and of the wheel electronics units, type of communication between wheel electronics unit and vehicular transceiving device etc. can also be varied.

It is pointed out at this point that the invention also relates to the positioning of tires as such, that is to say the patent claims must also be read in the sense of "devices and methods for positioning at least one tire on a vehicle". The term "wheel" would then also have to be replaced mentally by "tire" in the remaining part of the application.

Instead of using four receiving devices allocated to the respective wheels or wheel electronics units, respectively, it would also be conceivable to use only a single central receiving device which is then designed for receiving and evaluating the transmit signals from all wheel electronics units.

LIST OF REFERENCE DESIGNATIONS

10 Vehicle
11 Vehicle wheels
12 Wheel electronics units
13 Transceiving devices
14 Controller of the tire information device
15 Program-controlled device, microcontroller
16 Storage device
17 Vehicle information system
20 Wheel rim
21 Wheel tire
22 (first) sensor
23 Evaluating device
24 Control device
25 Transmitting device
26 Sampling device
27 Filter device
28 Phase shifting device
29 (second) sensor
30 Rotational position of a point on the wheel
31 Roadway
40 Frame
41 Burst
42 Pause
a Top position
b Contact-area entry
c Contact-area exit
d Bottommost position
e 3 o'clock position
f 9 o'clock position
g Earth's acceleration
t Time
A Acceleration
E Field strength
TI-T4 Duration
V Velocity
X1 Measurement signal
X2 Information signal
X3 Control signal
X4 Transmit signal
X5 Information signal
α Angle of rotation

The invention claimed is:

1. A wheel electronics unit for a tire information device, the wheel electronics unit, in an installed state, is disposed in a vehicle wheel of a vehicle, the wheel electronics unit comprising:
   a first sensor for recording a measurement signal having at least one first wheel-specific parameter; and
   an evaluating device for determining from the measurement signal a current rotational position of the vehicle wheel at a time of the measurement, said evaluating device having:
      a filter device for filtering the measurement signal; and
      a phase shifting device for reducing a phase shift generated by filtering the measurement signal.

2. The wheel electronics unit according to claim 1, further comprising a transmitting device for transmitting a transmit signal which contains an information item about at least one of the determined rotational position of the vehicle wheel or second wheel-specific parameters.

3. The wheel electronics unit according to claim 2, further comprising a control device for controlling said transmitting device such that the transmit signal is sent out in a predeterminable rotational position of the vehicle wheel or a predeterminable angular range of the vehicle wheel.

4. The wheel electronics unit according to claim 2, further comprising a control device for controlling said transmitting device such that the transmit signal is sent out during one or more rotations of the vehicle wheel several times.

5. The wheel electronics unit according to claim 2, further comprising a control device for controlling said transmitting device such that the transmit signal is sent out in a predeterminable rotational position of the vehicle wheel or a predeterminable angular range of the vehicle wheel on a basis of time or angle of rotation.

6. The wheel electronics unit according to claim 2, further comprising a control device for controlling said transmitting device such that the transmit signal is sent out 3 to 10 times per rotation of the vehicle wheel.

7. The wheel electronics unit according to claim 2, further comprising a control device for controlling said transmitting device such that the transmit signal is sent out 3 to 5 times per rotation of the vehicle wheel.

8. The wheel electronics unit according to claim 1, wherein said first sensor is selected from the group consisting of a position sensor and a position switch which determines the current rotational position of a predetermined point on the vehicle wheel by detecting known reference areas or reference points.

9. The wheel electronics unit according to claim 1, wherein said first sensor is selected from the group consisting of a magnetically sensitive sensor, a Hall sensor, and a Reed switch which determines the current rotational position of the vehicle wheel by measuring a known magnetic field.

10. The wheel electronics unit according to claim 1, wherein said first sensor is selected from the group consisting of inertial sensor, an acceleration sensor and a shock sensor which determines the current rotational position by means of an acceleration or derivation therefrom determined by an increase or a decrease in acceleration of the vehicle wheel.

11. The wheel electronics unit according to claim 1, wherein said first sensor is a piezoelectric sensor which determines changes in a curvature of a tire of the vehicle wheel.

12. The wheel electronics unit according to claim 1, wherein said evaluating device performs a gravitation-based evaluation of the measurement signals.

13. The wheel electronics unit according to claim 1, wherein said evaluating device has a sampling device for sampling the measurement signal for determining samples, wherein an evaluation in said evaluating device is carried out by means of samples determined.

14. The wheel electronics unit according to claim 13, further comprising a speed sensor for determining a speed of the vehicle wheel and in that said sampling device is constructed such that said sampling device performs an adaptive adaptation of a sampling time in which the measurement signal and is sampled in dependence on a determined speed of the vehicle wheel.

15. The wheel electronics unit according to claim 1, wherein said filter device has a constant, linear phase shift.

16. The wheel electronics unit according to claim 1, further comprising at least one second sensor for determining second wheel-specific parameters.

17. The wheel electronics unit according to claim 16, wherein said at least one second sensor determines at least one of a current tire pressure, a tire profile, a longitudinal acceleration of the vehicle wheel, a transverse acceleration of the vehicle wheel, or a tire temperature.

18. The wheel electronics unit according to claim 1, further comprising means for depositing in the transmit signal the information item which identifies whether a predetermined wheel position or rotational position could be determined or not.

19. The wheel electronics unit according to claim 1, wherein said phase shifting device compensates for the phase shift generated by filtering the measurement signal.

20. The wheel electronics unit according to claim 1, wherein said evaluating device performs a gravitation-based evaluation of the measurement signals, namely of a measured acceleration or of a derivation of the measured acceleration.

21. The wheel electronics unit according to claim 1, wherein said filter device is a Bessel filter.

22. A vehicle wheel for a vehicle equipped with a tire information device, the vehicle wheel comprising:
a rim;
a tire; and
at least one wheel electronics unit disposed on one of said rim or said tire, said wheel electronics unit containing:
a first sensor for recording a measurement signal having at least one first wheel-specific parameter; and
an evaluating device for determining from the measurement signal a current rotational position of the vehicle wheel at a time of the measurement, said evaluating device having:
a filter device for filtering the measurement signal; and
a phase shifting device for reducing a phase shift generated by filtering the measurement signal.

23. A vehicle, comprising:
a number of wheels;
a tire information device;
at least one wheel electronics unit disposed in at least one of said wheels, said wheel electronics unit containing:
a first sensor for recording a measurement signal having at least one first wheel-specific parameter; and
an evaluating device for determining from the measurement signal a current rotational position of the vehicle wheel at a time of the measurement, said evaluating device having:
a filter device for filtering the measurement signal; and
a phase shifting device for reducing a phase shift generated by filtering the measurement signal.

24. The vehicle according to claim 23, wherein the vehicle is a passenger car.

* * * * *